United States Patent
Kobayashi et al.

(10) Patent No.: US 7,287,910 B2
(45) Date of Patent: Oct. 30, 2007

(54) ANGULAR BALL BEARING AND ROLLING BEARING

(75) Inventors: Umemitsu Kobayashi, Mie (JP); Keiichi Ueda, Mie (JP)

(73) Assignee: NTN Corporation, Osaka (JP)

( * ) Notice: Subject to any disclaimer, the term of this patent is extended or adjusted under 35 U.S.C. 154(b) by 174 days.

(21) Appl. No.: 10/488,236

(22) PCT Filed: Feb. 2, 2002

(86) PCT No.: PCT/JP02/08899

§ 371 (c)(1),
(2), (4) Date: Mar. 2, 2004

(87) PCT Pub. No.: WO03/021119

PCT Pub. Date: Mar. 13, 2003

(65) Prior Publication Data

US 2004/0208408 A1 Oct. 21, 2004

(30) Foreign Application Priority Data

Sep. 3, 2001 (JP) ............................. 2001-265674
Nov. 28, 2001 (JP) ............................. 2001-361975
Dec. 26, 2001 (JP) ............................. 2001-394898

(51) Int. Cl.
*F16C 33/78* (2006.01)

(52) U.S. Cl. .................................................. 384/484

(58) Field of Classification Search ........ 384/480–482, 384/484, 485, 488, 513, 477; 74/424.81, 74/89.23

See application file for complete search history.

(56) References Cited

U.S. PATENT DOCUMENTS 1,420,416 A * 6/1922 Dlesk ........................... 384/477
3,234,810 A * 2/1966 Orner ....................... 74/424.87

(Continued)

FOREIGN PATENT DOCUMENTS

EP 0046321 A1 * 8/1981

(Continued)

OTHER PUBLICATIONS

Microfilm of the specification and drawings annexed to the request of Japanese Utility Model Application No. 156774/1984(Laid-open No. 70632/1986). (NTN Toyo Bearing co., Ltd.), May 14, 1986, p. 8, line 3—p. 9, line 1; Fig. 1.

Primary Examiner—Thomas R. Hannon
(74) Attorney, Agent, or Firm—Wenderoth, Lind & Ponack, L.L.P.

(57) ABSTRACT

A rolling bearing is constructed so that, even though adapted for seals, strength of the bearing rings and reduction of the front width will not occur. Also dimensions equivalent to a non-sealed type bearing can be achieved. Rolling elements are disposed between an inner ring and an outer ring with seals provided. One seal is fitted in a pressed state on a peripheral surface portion of a cylindrical surface forming a counterbore of the outer ring. By pressing, the seal is mounted without forming a slot. The other seal is fitted in a slot. The inner ring and the outer ring, or rolling elements of a bearing comprising the outer ring, inner ring, rolling elements and a retainer are subjected to carbonitriding and a grease using a urea compound as a thickening agent is sealed in the bearing.

1 Claim, 11 Drawing Sheets

U.S. PATENT DOCUMENTS

| | | | | |
|---|---|---|---|---|
| 4,015,883 A | * | 4/1977 | Taylor | 384/484 |
| 5,338,377 A | | 8/1994 | Mitamura et al. | |
| 5,385,412 A | | 1/1995 | Yatabe et al. | |
| 6,423,158 B1 | | 7/2002 | Maeda et al. | |
| 6,786,644 B2 | * | 9/2004 | Vignotto et al. | 384/484 |

FOREIGN PATENT DOCUMENTS

| | | |
|---|---|---|
| JP | 5-78814 | 3/1993 |
| JP | 7-035145 | 2/1995 |
| JP | 7-92104 | 10/1995 |
| JP | 8-174340 | 7/1996 |
| JP | 8-184323 | 7/1996 |
| JP | 9-317773 | 12/1997 |
| JP | 11-93972 | 4/1999 |
| JP | 2962817 | 8/1999 |
| JP | 2001-3139 | 1/2001 |
| JP | 2001-032048 | 2/2001 |
| JP | 2001-83166 | 3/2001 |

* cited by examiner

Fig. 2(A)
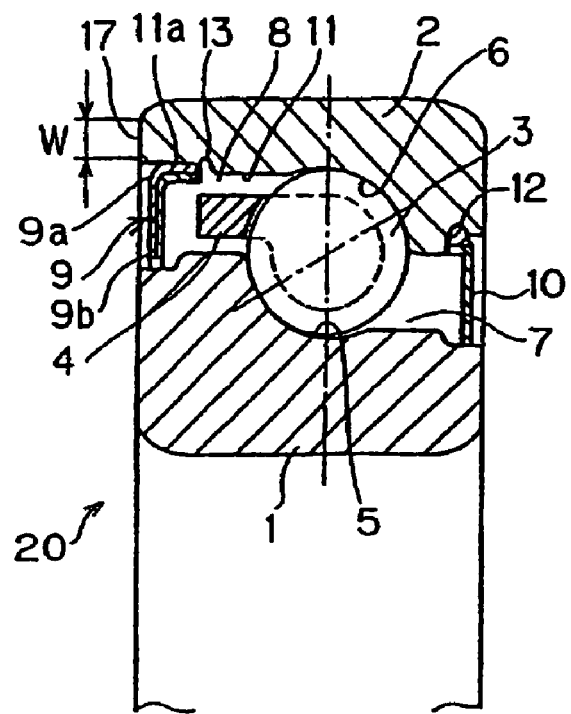
Fig. 2(B) - PRIOR ART
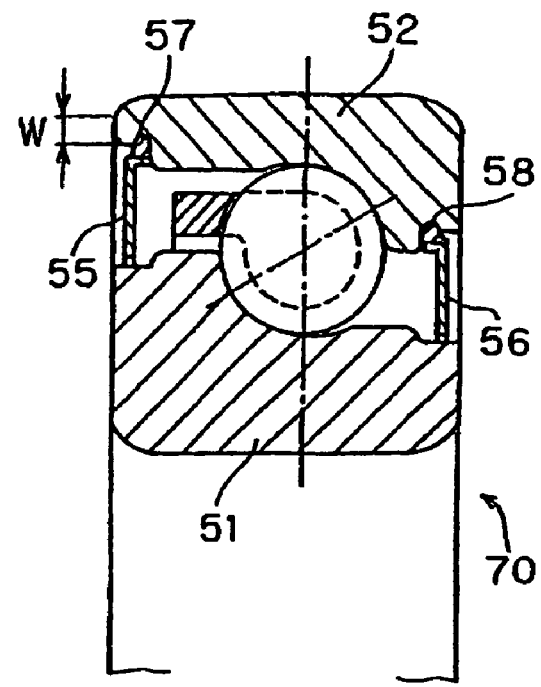
Fig. 3(A)
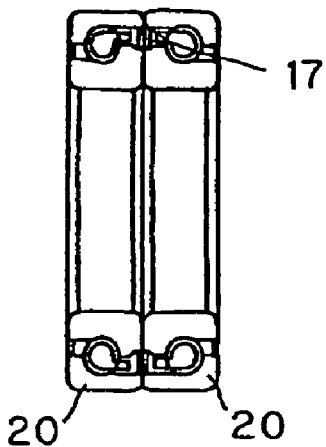
Fig. 3(B)
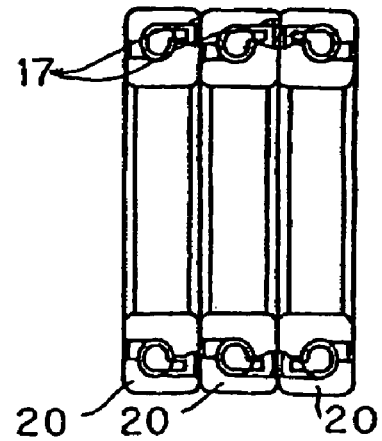

Fig. 8 - PRIOR ART
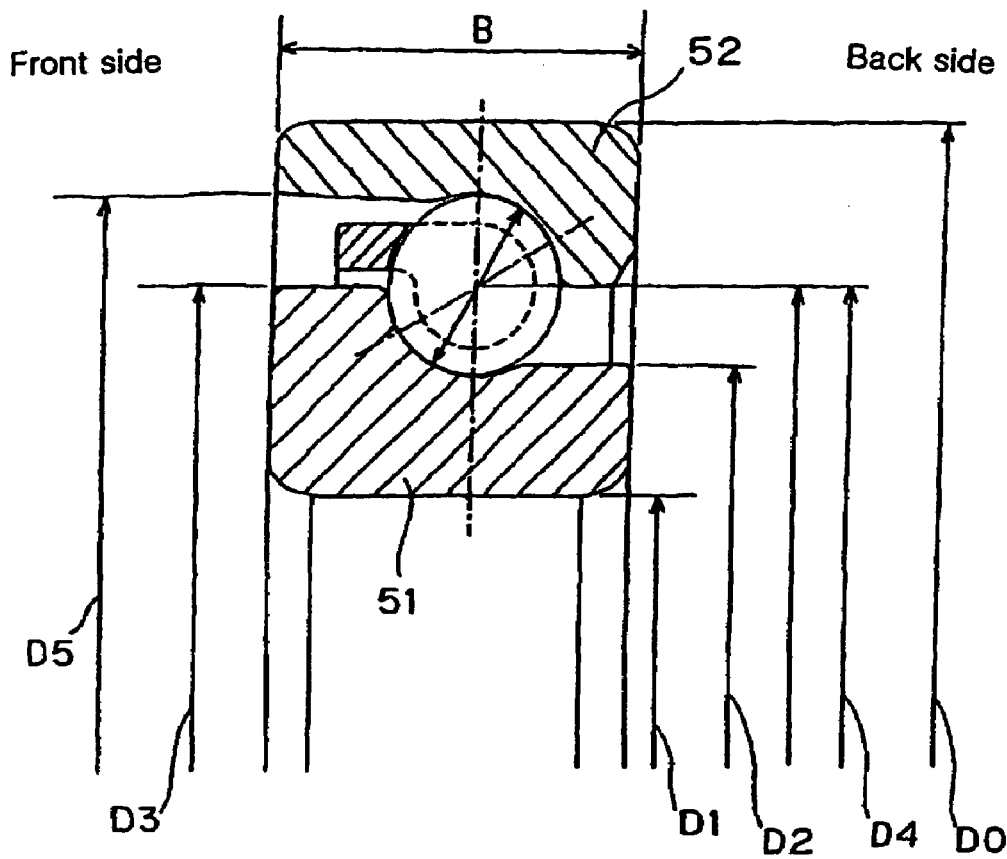
Fig. 9 - PRIOR ART
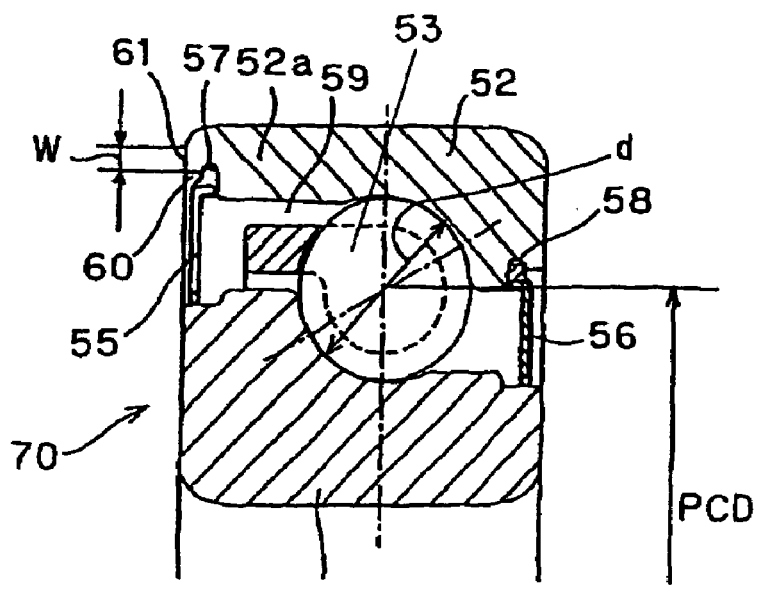

Fig. 10 - PRIOR ART
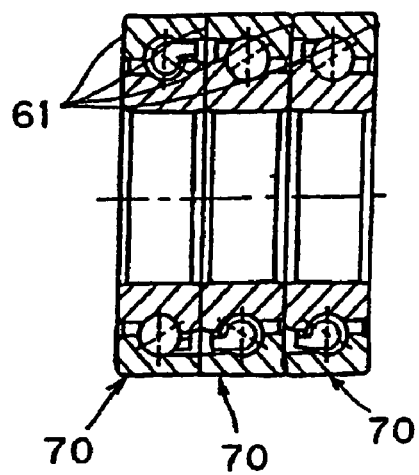
Fig. 11
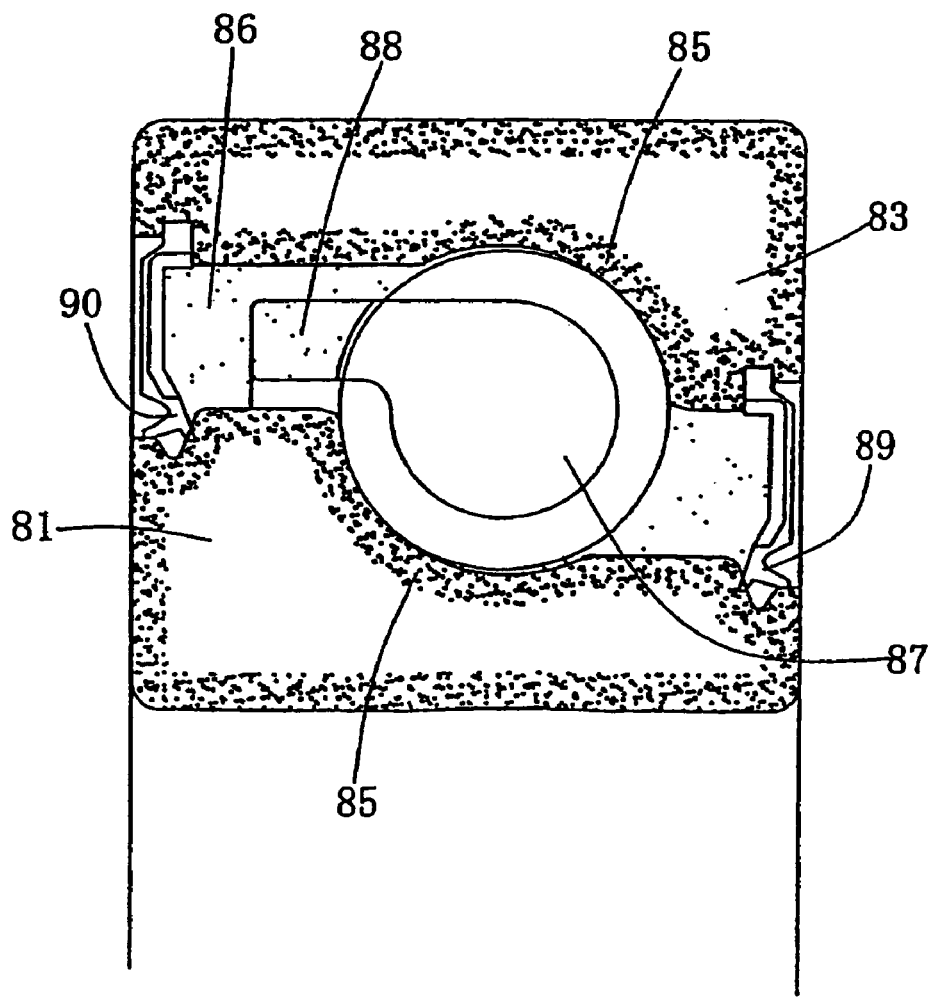

ANGULAR BALL BEARING AND ROLLING BEARING

TECHNICAL FIELD TO WHICH THE INVENTION BELONGS

This invention relates to angular ball bearings and rolling bearings with a seal used in general purpose industrial machinery at a support portion for a spindle of a machine tool or a ball screw support portion.

PRIOR ART

As shown in FIG. 8, an angular ball bearing has a large outer diameter D3 of the inner ring 51 on its loaded (front) side, and a small inner diameter D4 of the outer ring 52 on its loaded (back) side so that a high axial load can be borne. The inner diameter D2 of the inner ring 51 on its non-loaded side, and the inner diameter D5 of the outer ring 52 on its non-loaded side are provided with tapered portions called "counterbores" formed by cutting off one of the shoulders of each raceway groove for assimilability. As a result, the outer diameters D2 and D3 of the inner ring, and the inner diameters D4 and D5 of the outer ring are markedly different from each other.

For such an angular ball bearing, too, according to the intended use or form of use, as with a deep groove ball bearing, it is sometimes desired to be of a sealed type. Sealing means is provided to prevent lubricant retained in the bearing from leaking outside, and to prevent entry of dust and water into the bearing from outside. In order to make an angular ball bearing into a sealed type, as with an ordinary sealed ball bearing, as shown in FIG. 9, seals 55, 56 are fixed to the outer ring 52 in slots 57, 58. The seals 55, 56 may be of a contact type in which lips at their tips contact the inner ring 51 and noncontact type which do not contact.

Among machine tools, as shown in FIG. 12, there is one in which a ball screw 72 is rotated by a motor 71 to reciprocate a table 73 by the rotation of the ball screw 72. Such a machine tool is used to machine a workpiece 74 on the table 73 with a blade 75 while reciprocating the table 73.

In this arrangement, the ball screw 72 is usually supported by a bearing 76. As the bearing 76, an angular ball bearing is usually used. Lubrication is by grease or oil.

But in a bearing for supporting a ball screw for a machine tool, vibrating loads are often applied due to increase in vibrating components of machining loads produced during machining. With increase in such vibrating loads, fretting wear damage may develop on the rolling surfaces of such a support bearing. Such fretting wear damage develops due to minute sliding, minute rolling, minute vibration, etc and has a large influence on deterioration of the bearing performance such as poor rotation accuracy (tone).

In contrast, there is disclosed in JP patent publication 7-92104 a method in which the rolling surfaces are subjected to carbonitriding to increase the hardness of the rolling surfaces and improve the wear resistance.

PROBLEMS THE INVENTION INTENDS TO SOLVE

In the conventional angular ball bearing shown in FIG. 9, since the portion 52a of the outer ring 52 where the counterbore is formed is thin in the diametrical thickness, if the slot 57 for fixing the seal 55 is formed, the wall thickness of the outer ring 52 becomes too thin at its portion where the slot 57 is formed. This lowers the strength of the outer ring 52. Also, if the slot 57 is formed, since the inner peripheral portion 60 from the slot 57 to the outer ring width surface has a reduced diameter to introduce the seal 55, the front surface width W of the outer ring 52 becomes narrow. The width surface 61 of the outer ring 52 is a portion which serves for axial positioning of the bearing and is also a portion for bearing the pre-load. If a plurality of such bearings 70 are arranged as shown in FIG. 10, large loads are applied to the width surface 61 of the outer ring 52. Such an arrangement is usually employed for bearings for the support portion of e.g. a ball screw. For these reasons, insufficient front surface width W of the outer ring 58 will cause such trouble as the deformation of the outer ring 52 and poor positioning of the bearing due to decreased strength, and insufficient pre-load. While the front surface width W is influenced by dimensions of various parts of the bearing, if the slot 57 is formed at the portion of the counterbore 59, it is difficult to ensure the front surface width W.

For example, an angular ball bearing is designed so that (ball diameter)/(outer ring outer diameter−ball pitch circle diameter)=R will be in the range of 0.4–0.7. If the rate R is less than 0.4, the load bearing capability would be low compared with the size of the bearing. This is not economical. Conversely, if R is 0.7 or over, the balls 53 occupy the bearing cavity too much to ensure a sufficient wall thickness for the inner and outer rings 51, 52. For a bearing in which the rate R is near the lower limit 0.4 but 0.44 or over, if the slot 57 is formed as shown in FIG. 9, it is difficult to ensure a sufficient front surface width W for the outer ring 58.

To prevent this, one may think of reducing the ball pitch circle diameter PCD and the ball diameter d to reduce the outer ring inner diameter D5 on the front side (FIG. 8), thereby increasing the wall thickness of the outer ring front side. But with this arrangement, compared with a non-sealed type bearing having no seals, the rigidity of the support portion, the load bearing capacity of the bearing, and the rolling fatigue life would lower. In particular, in an angular ball bearing used to support a threaded shaft of a ball screw in a machine tool, such lowering of the load bearing capacity and rolling fatigue life is problematic. That is to say, reduced rigidity of the machine tool feed unit leads to lowering of the machining accuracy. This is a big disadvantage. As for the load bearing capacity and the rolling fatigue life, too, like the rigidity, their lowering is a big disadvantage.

On the other hand, due to the influence of internal design, it is sometimes difficult to ensure space for the seal 55 and its mounting portion with the same main dimensions as with a non-sealed type bearing. In such a case, one may think of extending the width B of the bearing. But since the main dimensions are changed, compatibility with a non-sealed type bearing is lost. This is not economical.

A first object of this invention is to provide an angular ball bearing which even though it is a sealed type, does not suffer from reduction in the strength of the bearing rings and lowering of the front surface width for convenience of mounting of the seals, and allows for design of dimensions equivalent to those of a non-sealed type bearing and practicality.

In recent years, for machine tools such as machines for making molds, machining into more complicated shapes is required. For working into such complicated shapes, microscopic feed is needed, and the more complicated the shape is, the greater the frequency of microscopic feed. Thus, on rolling surfaces of a rolling bearing at a support portion for a ball screw used in a machine tool, pivoting motion is frequently used, so that microscopic rolling frequently occurs. Thus, only applying carbonitriding is insufficient, and fretting wear damage often develops.

Therefore, a second object of this invention is to provide a rolling bearing having resistance to fretting even if used at a support portion for a ball screw of a machine tool for machining into complicated shapes in which the frequency of microscopic feed has increased.

MEANS TO SOLVE THE PROBLEMS

In the angular ball bearing of this invention, rolling elements are disposed between an inner ring and an outer ring, a seal is provided on at least on one side thereof, the seal on at least one side is fitted in a pressed state on a peripheral surface of a counterbore formed by cutting off one of shoulders of a raceway groove of the inner ring or the outer ring. That is, a seal is fitted in a pressed state on a flat peripheral surface portion of the counterbore.

With this arrangement, the seal provided on the peripheral surface of the bearing ring formed with a counterbore is fitted in a pressed state on the peripheral surface without forming a slot. Thus the seal can be mounted without locally thinning the wall thickness of the bearing ring at its portion where the counterbore is formed or reducing the front surface width. Mounting of the seal by pressing on the flat peripheral surface without forming a slot is made possible by suitably adjusting the sectional shape of the seal e.g. by expanding the axial width of the portion of the seal where it is pressed, e.g. by providing a short cylindrical portion on one side of the seal remote from the seal lip portion. Since the seal is fitted not in a groove, it is possible to design a sealed type angular ball bearing having main dimensions, such as ball pitch circle diameter, ball diameter, etc. which are equivalent to those of a non-sealed type bearing. As a result, an angular ball bearing is provided which is high in reliability with respect to leak of lubricant to outside and invasion of powder, dust, water, etc. into the bearing from outside. Also, since it has parts, dimensions of which are equivalent to those of a non-sealed type bearing, it can be designed equivalently in rigidity of the support portion, load bearing capacity and fatigue life. Thus, it has compatibility with a non-sealed type bearing.

A cylindrical seal mounting surface may be formed on the peripheral portion of the counterbore of the inner ring or the outer ring to fit the seal in a pressed state on the seal mounting surface.

If the seal mounting surface is a cylindrical surface, control of interference for pressing is easy, so that stable pressing is possible. If the peripheral surface portion is a tapered surface, even if the cylindrical seal mounting surface is formed, unlike a slot, influence on the wall thickness of the bearing ring or front surface width is small. Thus it is possible to provide a bearing ring having a wall thickness and a front surface width that are practically equivalent to the arrangement in which the seal mounting surface is not cylindrical.

According to this invention, the bearing may have a seal on the front side, fitted in a pressed state on the peripheral portion of the counterbore on the front side of the outer ring, and a seal on the backside fitted in a slot on the inner peripheral surface of the outer ring on the backside. If a seal is mounted in a slot, the axial width of the mounting portion may be narrow. Like on the backside, at a portion where the axial width from the raceway groove of the outer ring to the width surface is narrow but the diametrical wall thickness is thick, there will be no shortage of the mounting surface. Thus a seal can be mounted without causing a problem of lowered strength due to the formation of a slot. Thus, by pressing a seal onto the flat peripheral surface portion at a portion where the outer ring is thin, and by mounting it in a slot at a portion where it is axially narrow and thick in the diametric direction, mounting of seals can be done easily and rigidly without any influence on the bearing rings.

In this invention, the dimensions of the parts may be in the following relations. That is, (bearing width)/(inner diameter of inner ring)=0.2-1.0, and (bearing width)/(ball diameter) =1.5-2.2.

Among the major dimensions of an angular ball bearing, such as the inner ring outer diameter, outer ring outer diameter, bearing width or height, and chamfer dimension, some are standardized by the International Standardization Organization (ISO), but others are not. In either case, (bearing width)/(inner diameter of inner ring)=S is 0.2-1.0. If S is less than 0.2, it is impossible to employ a sufficient ball size relative to the bearing size, so that no sufficient load-bearing capacity can be obtained. Conversely, if S exceeds 1.0, the space which the bearing occupies increases, which increases the entire device. This is not economical. (bearing width)/(ball diameter)=T is 1.5 to 2.2 under the above standardization. If T is less than 1.5, the rate at which the balls occupy in the bearing cavity increases. This will make it difficult to ensure a sufficient wall thickness of the bearing rings. Conversely, if T exceeds 2.2, the load-bearing capacity is low compared to the bearing size. This is uneconomical. In a bearing of which the rates S and T are in the above preferable ranges, it is possible to employ a structure in which a seal is mounted by pressing on the flat peripheral surface portion which is the counterbore in this invention. Thus the above said functions and effects due to this mounting structure are revealed.

(ball diameter)/(outer diameter of outer ring–ball pitch circle diameter) may be 0.44 or over.

The angular ball bearing used for a ball screw in a machine tool is, as described in the section about problems the invention intends to solve, designed with the value (ball diameter)/(outer diameter of outer ring–ball pitch circle diameter)=R in the range of 0.4 to 0.7. Even if the rate R of the balls is close to the lower limit 0.4; for a bearing in which this value is 0.44 or over, if a slot is formed as in the prior art, it is difficult to ensure a sufficient front surface width on the outer ring.

Thus, in conventional bearings, in order to make it possible to mount a seal, the ball occupying rate R had to be reduced to the limit, thereby restricting the load bearing capacity. Since this invention employs a structure in which the seal is pressed on the flat peripheral surface portion, while it has seals, it can be designed with a large ball occupying rate R to 0.44 or over, and thus a large load bearing capacity is assured.

The angular ball bearing of this invention may be used for supporting the threaded shaft of a ball screw.

Since high axial loads are applied to an angular ball bearing used for supporting the threaded shaft of a ball screw, a bearing having a large contact angle e.g. 30° or over, i.e. a bearing that is high in the axial load bearing capacity is required. If the contact angle increases, the counterbore deepens correspondingly, so that the front surface width of the bearing ring decreases. Even in a bearing having such a large contact angle, by employing the seal mounting structure according to this invention by pressing on the peripheral surface portion, there are no lowering of strength and lowering of the front surface width, it can be mounted in this way.

Also, the second object of this invention is solved by using a rolling bearing which comprises an outer ring, an inner ring, rolling elements and retainer, and in which the inner ring and the outer ring, or the rolling elements are subjected to carbonitriding, and a grease using a urea compound as a thickening agent is sealed in the bearing.

The inner ring and outer ring, or the rolling elements are subjected to carbonitriding, and a grease using a urea compound as a thickening agent is sealed in the bearing. As a result, a thin oxide film of a urea compound is formed, and an oil film having a sufficient thickness is formed on the oxide film. Since this thin oxide film of a urea compound is high in adhesion to the carbonitrided layer, even if micro rolling occurs frequently, grease is retained on the rolling surfaces, so that it is possible to effectively prevent lowering of durability by suppressing fretting damage on the raceway surfaces. Also, even if oil film of the grease between the rolling elements and the raceway surfaces breaks, so that the rolling elements and raceway surfaces contact directly, due to the function of the carbonitrided layer provided on the rolling elements or raceway surfaces, development and progression of fretting damage is suppressed for a while. Also, since oil film of the grease is high in adhesion to the carbonitrided layer, even if breakage occurs, it is repaired quickly. Thus, even if the oil film breaks and the rolling elements and raceway surfaces directly contact, it is possible to repair the oil film before fretting damage develops. Thus, resistance to fretting damage markedly improves.

BRIEF DESCRIPTION OF THE DRAWINGS

FIG. 2(A) is a partially sectional view of the same embodiment, FIG. 2(B) is a partially sectional view of a conventional bearing of the same size a the bearing of FIG. 2(A) for comparison therewith, FIGS. 3(A) and 3(B) are sectional views showing arrangements of the angular ball bearings of the same embodiment, FIG. 8 is a sectional view of a conventional nonsealed type angular ball bearing, FIG. 9 is a sectional view of a conventional sealed type angular ball bearing, FIG. 10 is a sectional view of an example of parallel arrangement of conventional angular ball bearings, FIG. 11 is a sectional view showing an example of the angular ball bearing according to this invention.

EMBODIMENTS OF THE INVENTION

Figure 1:
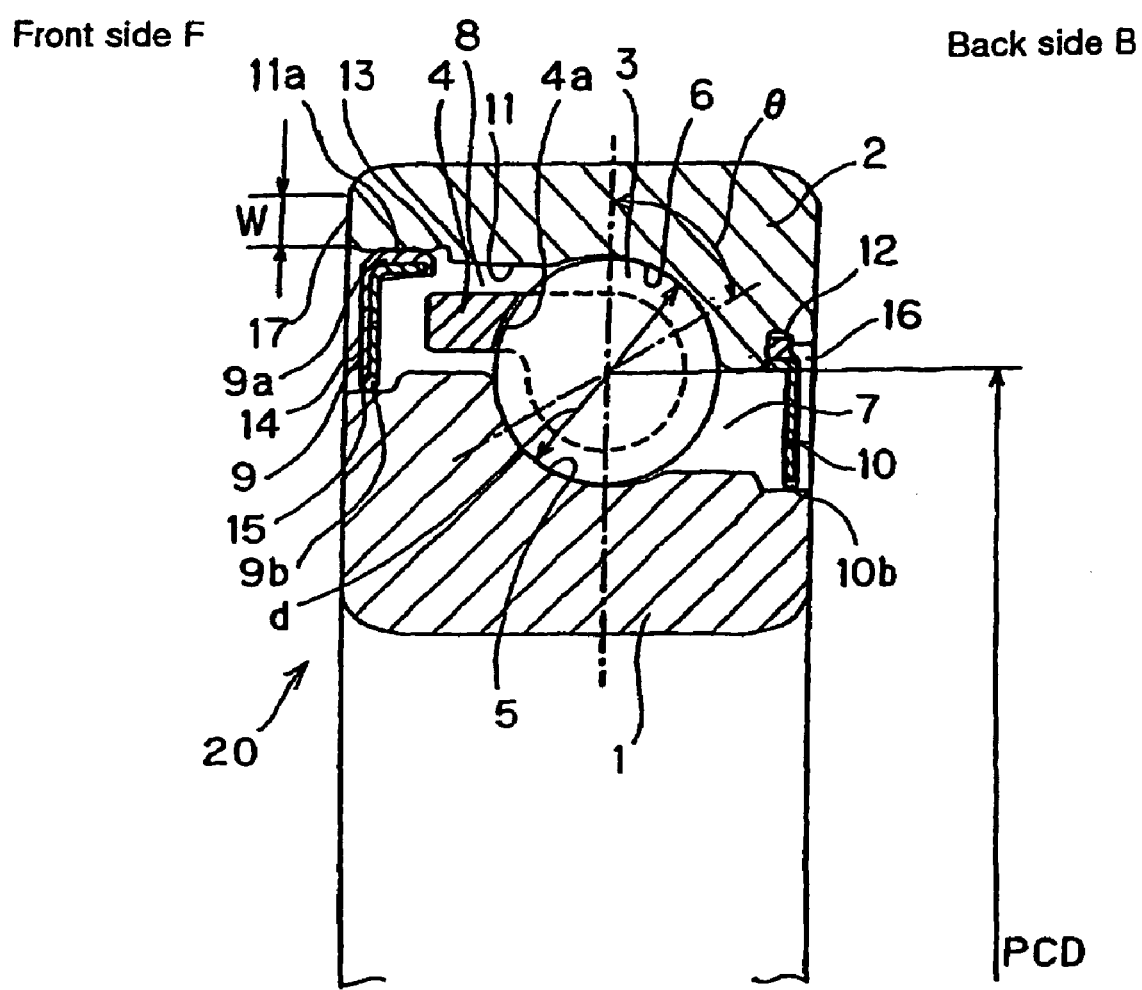
FIG. 1 is a partially sectional view of the angular ball bearing of one embodiment of this invention.

The first embodiment of this invention will be described with reference to the drawings. In this angular ball bearing, a plurality of rolling elements 3 are disposed between raceway grooves 5 and 6 of an inner ring 1 and an outer ring 2 as bearing rings. These rolling elements 3 are retained in pockets 4a of a retainer 4. Compared with deep groove ball bearings, the inner ring 1 has a larger outer diameter on the loaded side (front side F), while the outer ring 2 has a smaller inner diameter on the loaded side (backside B) to create a contact angle θ between the raceway grooves 5 and 6. For the sake of assembling the bearing, a counterbore 7 where one of the shoulders of the raceway groove 5 is cut off is formed on the non-loaded side of the inner ring 1. A counterbore 8 where one of the shoulders of the raceway groove 6 is cut off is formed on the non-loaded side of the outer ring 2, too.

In the bearing cavity between the inner and outer rings 1 and 2, seals 9 and 10 are arranged. The seal 9 on the front side F is pressed into the inner peripheral surface 11 of the outer ring 2 which forms the counterbore 8. The seal 10 on the backside B is fitted in a slot 12 formed in the inner-diameter surface of the outer ring 2. These seals 9 and 10 may be contact seals or non-contact seals, but are contact seals in this embodiment.

The inner peripheral surface 11 forming the counterbore 8 of the outer ring 2 is a conical surface, and a portion outside of the bearing is a cylindrical seal mounting surface 11a. The seal 9 on the front side has a short cylindrical fitting portion 9a at its proximal end, i.e. opposite a seal lip portion. The fitting portion 9a is pressed into the seal mounting surface 11a. Since the seal 9 on the front side is pressed with interference, it will not fall after press-fitting. The fitting force between the seal 9 and the outer ring 2 is freely selectable by adjusting the interference. The short cylindrical fitting portion 9a is cylindrical with its outer-diameter surface parallel to the axial direction. The seal 9 has a core metal 14 to which is fixed an elastic member 15. The seal lip portion 9b formed by an elastic member 15 is in contact with the outer peripheral surface of the inner ring 1. The core metal 14 has an L-shaped section with one edge forming the fitting portion 9a. Part of the elastic member 15 covers the outer periphery of the short cylindrical portion 9a at the proximal end of the core metal 14 in contact with the seal mounting surface 11a. But the core metal 14 may be directly fitted on the seal mounting surface 11a. Also, the outer-diameter surface of the fitting portion 9a may not be a cylindrical surface but be tapered. Even if it is tapered, the seal 9 can be fixed. If it is tapered, the seal mounting surface 11a of the outer ring 2, too, is a tapered surface. For example, it is a surface contiguous with the other portion of the inner peripheral surface 11.

The seal mounting surface 11a may be finished by lathe turning or grinding. At the edge of the seal mounting surface 11a opposite the press-fitting side, a recess 13 is formed to allow a lathing tool and a grinder to be removed. While the recess 13 is a kind of groove, since it is not used to fix the seal 9 on the front side, it is shallow in groove depth and will not result in insufficient wall thickness of the outer ring 2.

The shape of the seal lip portion 9b can be arbitrarily determined, and either of the contact type and noncontact type may be used.

The seal 10 on the backside has an elastic member integrally fixed to a core metal and fitted in the slot 12 of the outer ring 2. The portion 16 of the outer ring 2 from the slot 12 to its inner edge has an increased inner diameter to introduce the seal 10 on the backside. The shape of the seal lip portion 10b of the seal 10 on the backside may also be either the contact type or noncontact type.

The peripheral surfaces of the inner ring 1 and outer ring 2 opposing the seal lip portions 9b and 10b of the seals 9 and 10 are flat in this embodiment. But they may be formed with oil grooves in which the seal lip portions 9b and 10b of the seals 9 and 10 may contact or be loosely fitted. The lubrication of the bearing may be by grease or oil.

With this arrangement, since the seals 9 and 10 are provided on the front side and backside, respectively, it can be a sealed type. Thus it can be an angular ball bearing which is high in reliability and prevents leakage of the lubricant and entry of dust and water into the bearing from outside. The seal 9 on the front side provided at the peripheral surface portion 11 formed with the counterbore 8 of the outer ring 2 is fitted in the inner peripheral portion 11 by pressing. Thus it can be fitted without the need of forming a slot. The shape of the seal 9 on the front side can be of any shape so long as the fixed portion can be mounted on the flat seal mounting surface 11a. The shape of the seal lip portion 9b can be arbitrarily determined, and may be either contact type or noncontact type. Since the shape of the seal lip portion 9b of the seal 9 on the front side is no different from that of a conventional groove-fitted type seal, the function of preventing leakage of lubricant and the function of preventing dust, debris or water from entering into the bearing from outside will not be reduced. Although the seal 10 on the backside is fitted in the slot 12, since the outer ring 2 is thick in the wall thickness on the backside, there will be no problem of lowering the strength due to the provision of slot 12. Since the backside is narrow in the axial width from the raceway groove 6 of the outer ring 2 to the end face, by providing the slot 12, it can be easily mounted in a narrow space.

Since the seal 9 on the front side can be fixed at the portion of the outer ring 2 where the counterbore 8 is formed, without forming a groove, it is possible to have a substantially uniform inner diameter of the seal mounting surface 11a and thereby prevent local reduction in the wall thickness at the abovesaid portion of the outer ring 2. It is also possible to ensure the front surface width W. Also, both the seals 9 and 10 on the front side and backside can be fixed in the bearing internal space in the case of a non-sealed type bearing. Thus, there will be no change in width even if it is of the sealed type.

Thus, with the angular ball bearing of this embodiment, it is possible to design a sealed type bearing having the same main dimensions, ball pitch circle diameter PCD, and ball diameter $\underline{d}$ as a non-sealed type bearing. Thus, the reliability improves in preventing leakage of the lubricant to outside and preventing dust, debris and water from entering the bearing. Also, it is possible to achieve the rigidity of support portions, load bearing capacity and rolling fatigue life, that are equivalent to those of a non-sealed type bearing. Thus, the angular ball bearing of this embodiment is compatible with a non-sealed type bearing.

FIG. 2A is a view showing an angular ball bearing in which the bearing of this embodiment is applied to an angular ball bearing for supporting a ball screw, and FIG. 2B shows a conventional angular ball bearing in which seals are fixed in slots, by arranging them side by side with the same dimensions for comparison sake. As for the bearing size, the inner ring inner diameter is 75 mm, the bearing width is 20 mm, and the contact angle is 60° for both.

R=((ball diameter)/(outer diameter of outer ring−ball pitch circle diameter)=0.549

If a sealed type angular ball bearing (FIG. 2(B)) is designed with a conventional arrangement in which a slot 57 is formed, as described in the section describing problems the invention intends to solve, the front surface width W of the outer ring 52 on the front side, and the wall thickness of the outer ring 52 at the portion of the counterbore would be too small at the portion of the slot 57, problems such as deformation of the outer ring 52 and poor bearing positioning, and insufficient pre-load will be caused.

On the other hand, in the embodiment of this invention (FIG. 2(A)), the seals 9 and 10 are both fixed to the outer ring 2 with the seal 10 on the backside fixed in the slot 12 similar to a conventional one and the seal 9 on the front side fixed by pressing to form a sealed type bearing.

In this case, there is no reduction in the front surface width W of the outer ring on the front side and the wall thickness of the outer ring at the counterbore portion 8 as in the conventional arrangement. Thus it will be a practicable design.

In this embodiment (FIG. 1, FIG. 2(A)), axial positioning of the seal 9 on the front side is controlled by the difference between the width surface 17 of the outer ring on the front side and the width surface of the seal 9. As shown in FIGS. 1 and 2(A), the seal 9 is disposed entirely within the gap between the inner and outer rings so as to not protrude axially beyond the inner and outer rings, and the seal 9 is disposed without bearing against any axially-facing surface of the inner and outer rings. But positioning may be done by pushing the seal 9 into the boundary between the recess 3 and the counterbore portion 8.

Figure 4A:
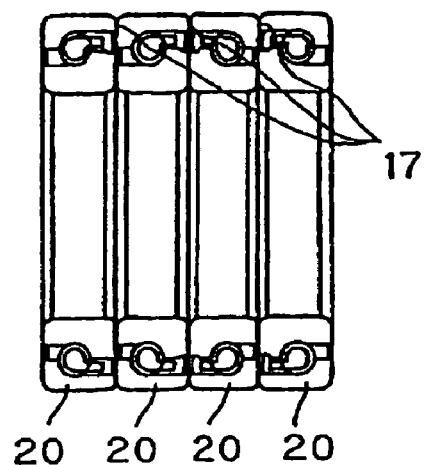
FIGS. 4(A) and 4(B) are sectional views showing other arrangements of the angular ball bearing of the same embodiment.
Figure 4B:
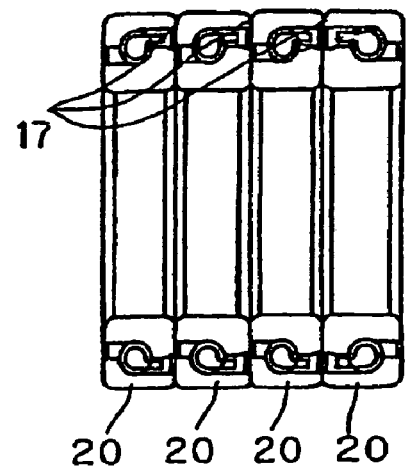

Angular ball bearings for supporting a ball screw often form a support portion by combining a plurality of rows, for example, by using in two or three rows as shown in FIGS. 3(A) and 3(B), or in four rows as shown in FIGS. 4(A) or 4(B). In the example of FIG. 3(A), two rows of angular ball bearings 20 are arranged with their fronts facing each other to bear axial loads in one row. In the example of FIG. 3(B), two (two right rows in the figure) of the three rows have their fronts facing each other, and the remaining row arranged facing the same direction as the adjacent one to bear axial loads in two rows. In the example of FIG. 4(A), the central two rows have their front facing each other with the rows on both sides thereof in the same direction as the adjacent one (so-called DFTT combination) to bear axial loads in three rows. In the example of FIG. 4(B), two at one end (right in the figure) of the four rows have their fronts facing each other and the remaining two rows in the same direction as the adjacent one (DTFT combination) to bear axial loads in three rows.

When angular ball bearings 20 are arranged in a plurality of rows in this manner, large loads are applied to the width surface W of the outer ring 2 on the front side (ditto for the width surface of the inner ring 1 on the backside). But with the angular ball bearings 20 of this embodiment, since the front width W of the outer ring 2 is sufficiently ensured, they can be used even for applications in which they are combined in a plurality of rows as described above. Besides, since they have main dimensions, rigidity of support portions, load bearing capacity and rolling fatigue life which are equivalent to those of a non-sealed type bearing, replacement of a non-sealed type bearing with the sealed type bearing of this embodiment will result in no functional trouble.

Figure 5:
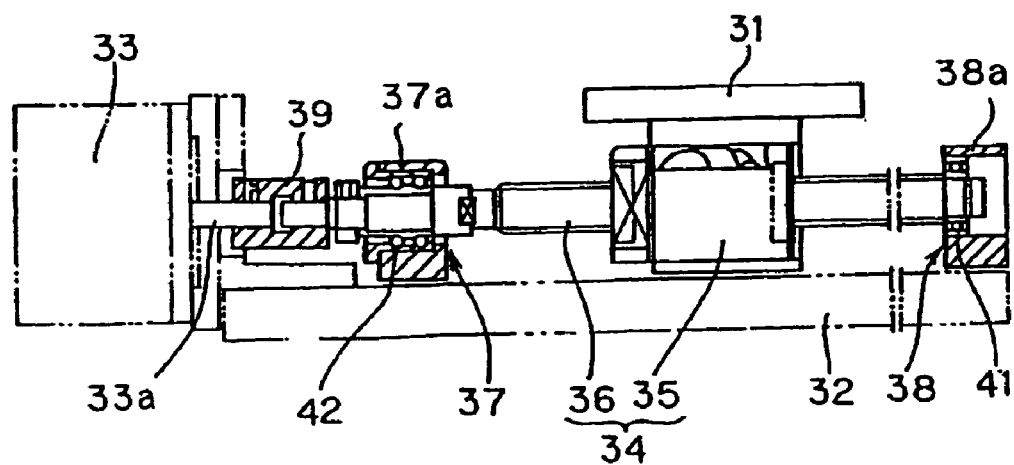
FIG. 5 is a sectional view showing a feed mechanism of a machine tool using the angular ball bearing.

FIG. 5 shows a feed mechanism of a machine tool using this angular ball bearing. A table 31 is reciprocally mounted on a base 32 through a guide (not shown), and is reciprocated by driving a motor 33 through a ball screw 34. The ball screw 34 has a nut 35 mounted to the table 31 and a threaded shaft 36 rotatably supported on the base 32 at support portions 37 and 38 at both ends thereof. The threaded shaft 36 is coupled to the motor shaft 33a of the driving motor 33 through a coupling 39. The support portions 37, 38 support the threaded shaft 36 through rolling bearings 42, 41 provided in housings 37a and 38a. For the rolling bearing 42 of the support portion 37 on the side of the driving motor 33, the angular ball bearings of the above embodiment are used. For the support portion 37, angular ball bearings 20 are arranged in a plurality of rows as shown in FIGS. 3(A) and 3(B), FIGS. 4(A) and (B).

Next, the dimensional relation of parts of the angular ball bearing 20 of the first embodiment shown in FIG. 1 will be described. This dimensional relation is an example when e.g. it is applied to a bearing for supporting a ball screw used in a feed line of a machine tool.

In this angular ball bearing,

S=(bearing width)/(inner diameter of inner ring)=0.2 to 1.0

T=(bearing width)/(ball diameter)=1.5 to 2.2

Also,

R=(ball diameter)/(outer diameter of outer ring−ball pitch circle diameter)≧0.44

Also,

R≦0.7

The contact angle θ is 30° or over.

The main dimensions of rolling bearings refer to dimensions that show the contour of bearings. For international compatibility and economical production, they are standardized by International Standards Organization (ISO). In Japan, they are stipulated under JIS B 1512. The main dimensions are the inner diameter, outer diameter, width or height of a bearing and chambering dimensions. These dimensions are important when the bearing is mounted on a shaft and a housing. In principle, dimensions concerning the internal structure are not stipulated. While many dimensions of rolling bearings are stipulated, they are for preparation of the future standardization, and those actually used now are not all of these dimension groups.

As described above, while there are standardized ones and non-standardized ones among the main dimensions for rolling bearings, in either case, (bearing width)/(inner ring inner diameter)=S is 0.2 to 1.0. If S is less than 0.2, it is impossible to employ a sufficient ball size relative to the bearing size. Thus a sufficient load bearing capacity is not obtainable. Conversely, if S exceeds 1.0, the bearing occupying space increases, so that the entire device becomes bulky. This is uneconomical.

Also, (bearing width)/(ball diameter)=T is preferably 1.5 to 2.2 for the above standardization and the like. If T is less than 1.5, the rate at which the balls occupy in the bearing cavity increases, so that it becomes difficult to ensure a sufficient wall thickness of the raceway ring. Conversely, if T exceeds 2.2, the load bearing capacity will be low compared with the bearing size. This is uneconomical. With a bearing of which the rates S and T are in preferable ranges, a structure can be employed in which the seal 9 is mounted by pressing into the flat peripheral surface portion which forms the counterbore 8 in this embodiment. In such a case, the above functions and effects are revealed.

For an angular ball bearing used e.g. for a ball screw of of a machine tool, the value of (ball diameter)/(outer ring outer diameter−ball pitch circle diameter)=R is, as described in the section of problems the invention intends to solve, usually set in a range of 0.4 to 0.7. If the rate R is 0.4 or less, the load bearing capacity would be low for the bearing size. This is uneconomical. Conversely, if R is 0.7 or over, the rate at which the balls occupy in the bearing cavity would increase. This makes it difficult to ensure sufficient wall thicknesses of the inner and outer rings. In a bearing in which even though the ball occupying rate R is close to the lower limit 0.4, if it is 0.44 or over, a slot 57 is formed as in the conventional example of FIG. 9, it becomes difficult to ensure a sufficient front surface width W of the outer ring 58.

Thus, in a conventional bearing, in order to make it possible to mount seals, it was necessary to decrease the ball occupying rate R as much as possible, thereby restricting the load bearing capacity. In this invention, since a seal is pressed into the flat peripheral surface portion, it is possible to increase the ball occupying rate R to 0.44 or over. Thus, design which permits a larger load bearing capacity is possible.

As for the contact angle θ, to a bearing for supporting a ball screw of a machine tool, since high axial loads are applied, the bearing should have a contact angle θ of 30° or over. Namely, the angular ball bearing 30 has a high axial load bearing capacity.

Figure 6:
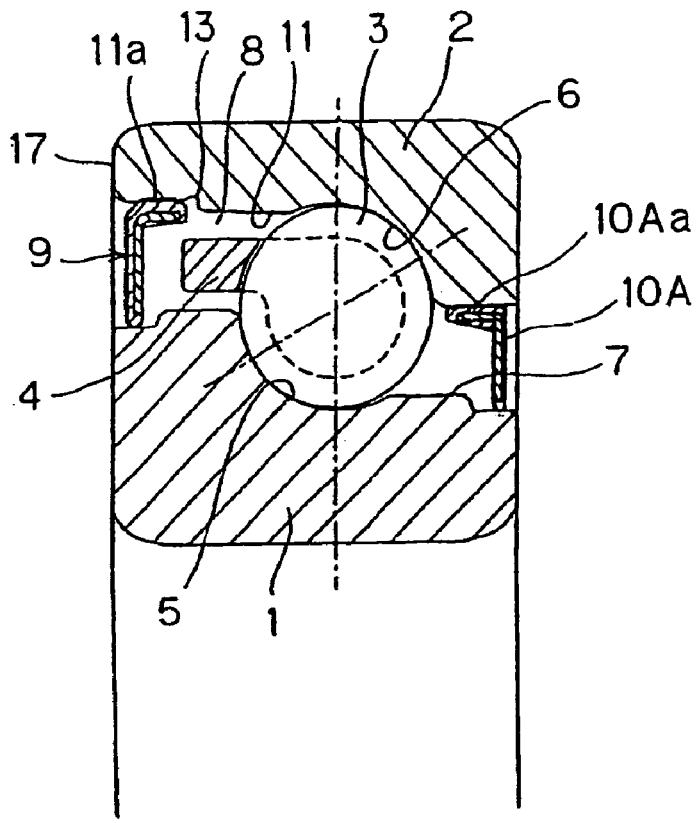
FIG. 6 is a partially sectional view showing the angular ball bearing of another embodiment of this invention.

In the above embodiment, the seal 10 on the backside is fitted on the outer ring 2 using the slot 12. But as shown in FIG. 6, like the seal 9 on the front side, the seal 10A on the backside, too, may be pressed into the inner peripheral surface of the outer ring 2. In this case, the seal 10A on the backside is, like the seal 9 on the front side, formed into a shape having a tubular fitting portion 10A*a* at the proximal end. In the embodiment of FIG. 6, the seal 10A on the backside has the same sectional shape except that it is different in diameter from the seal 9 on the front side.

Figure 7:
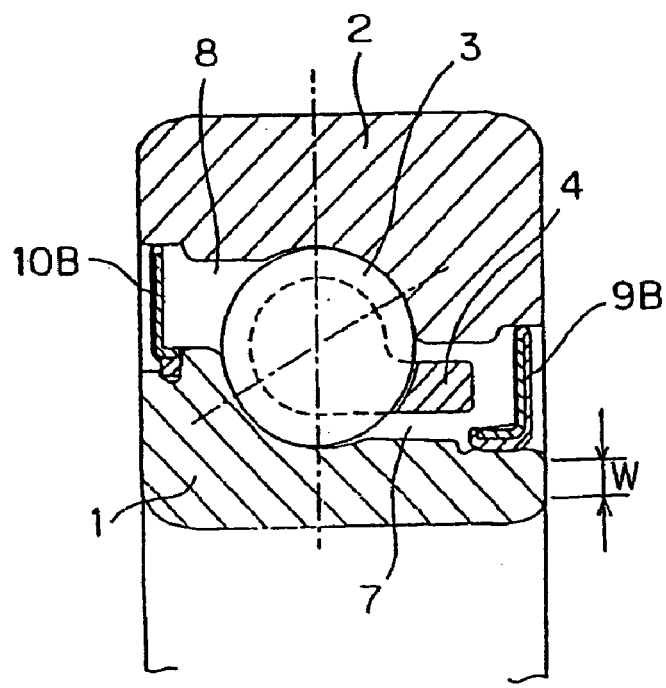
FIG. 7 is a partially sectional view showing the angular ball bearing of still another embodiment.
Figure 12:
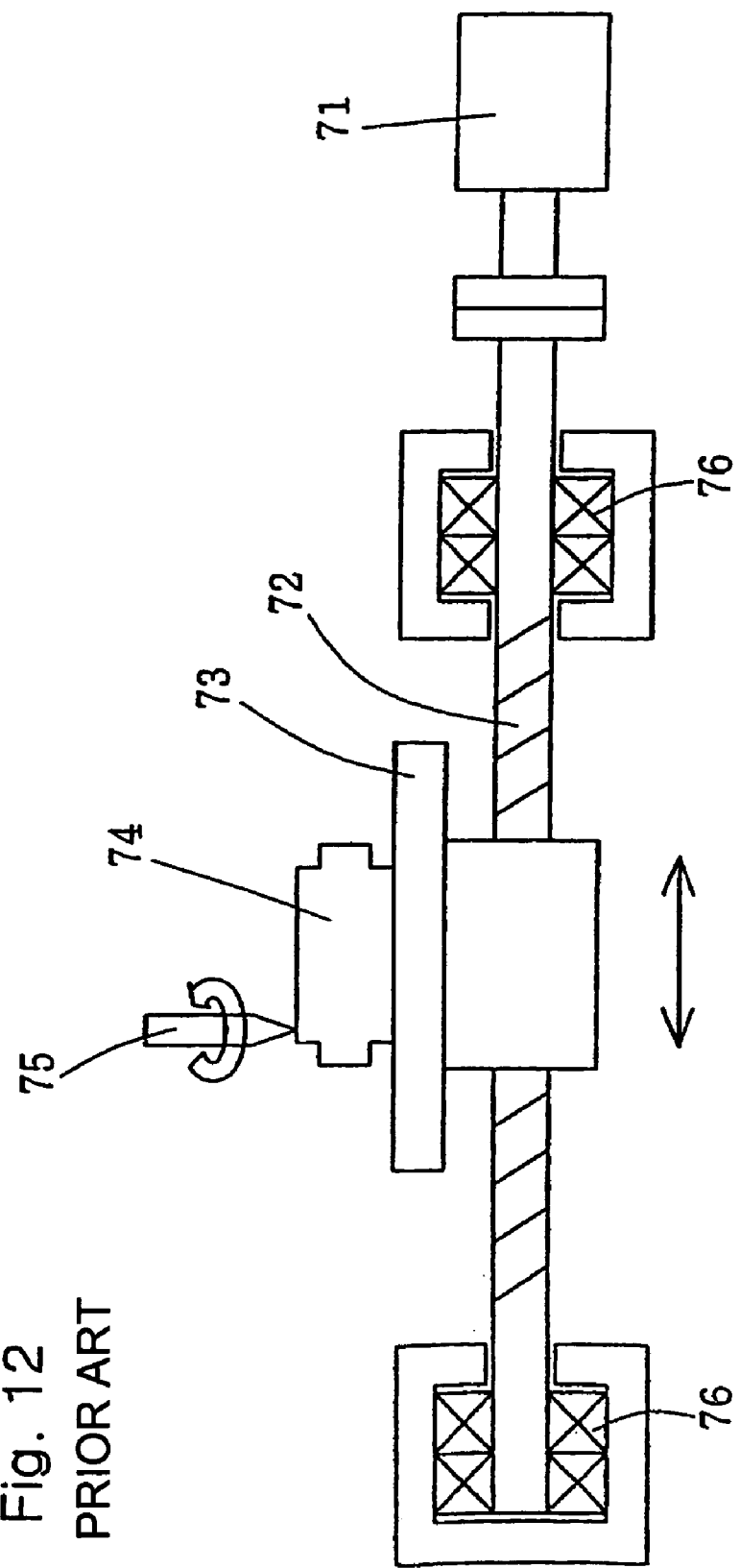
FIG. 12 is a schematic view showing an example of a machining device using a bearing for supporting a ball screw.

In the above embodiments, the seals 9, 10, 10A are mounted on the outer ring 2. But this invention is also applicable to the arrangement in which seals 9B and 10B are fitted on the inner ring 1 as shown in FIG. 7. In this case, the seal 9B is pressed on the portion of the inner ring 1 where a counterbore 7 is formed.

In the above embodiments, the seals 9, 10, 10A, 9B, 10B have an elastic member such as rubber fixed to a core metal. But these seals may be metallic shield plates or of an oil seal type. In any of the above embodiments, seals 9, 10, 10A are provided on both sides. But according to the intended use, this invention is applicable to an arrangement in which a seal is provided only on one side if the seal is fitted on the counterbore side.

Next, the rolling bearing according to this invention is, as shown in FIG. 11, a bearing comprising an outer ring 83, an inner ring 81, rolling elements 87 and a retainer 88, and in which cabonitrided layers 85 are provided by subjecting the inner ring 81 and the outer ring 83 to carbonitriding, and grease 86 using a urea compound as a thickening agent is sealed in the bearing. Also, while not shown in FIG. 11, a rolling bearing in which carbonitrided layers 85 are formed on the rolling elements 87 instead of on the inner ring 81 and the outer ring 83 is included in the rolling bearing of this invention.

As material for the outer ring 83, inner ring 81 and rolling elements 87, SUJ2, SUJ3 or steel containing C: 0.1-1.0 wt %, Mn 0.1-1.0 wt %, Cr 0.1-20 balance being Fe and unavoidable impurities, etc. can be cited.

The carbonitriding is one of the means for hardening a metallic surface. The carbonitriding is applied because with ordinary carbonization it is possible to obtain a tough material, but it is unstable to heat. In contrast, by nitriding, the material surface is hardened and the residual austerity becomes stable to heat, so that the material becomes resistant to impact. Further, a suitable amount of carbide deposits, so that it is possible to increase the fatigue strength without lowering the resistance to cracking. Such a carbonitrided layer 85 may be formed on the inner ring 81 and outer ring 83, or on the rolling elements 87.

As the carbonitriding method, after carbonitriding in a high-temperature gas in which ammonium gas is added to a carbonizing atmosphere, the material may be hardened and tempered.

The amount of the residual austerity is preferably 20-40%. If less than 20%, improvement in the rolling fatigue life may not be sufficient. On the other hand, if over 40%, the hardness of the carbonitrided layer may decrease, so that the wear resistance properties lower.

The grease 86 contains a urea compound as a thickening agent, and a base oil added thereto. By using a grease of which the thickening agent is a urea compound, a thin oxide film of urea compound is formed on the raceways of the inner and outer rings. On the film, an oil film having a sufficient thickness is formed.

In particular, by applying carbonitriding to the inner and outer raceways, even if oil film of grease between the rolling elements and the raceways disappears and the rolling elements and the raceways directly contact, due to the function of the carbonitrided layer formed on the raceways or rolling elements, progression of fretting wear damage is suppressed. Also, oil film of grease is high in adhesion to the carbonitrided layers, even if breakage of oil film occurs, it is quickly repaired. Thus, due to the synergistic effects of the grease and the carbonitrided layer, it is possible to suppress fretting wear and effectively prevent lowering of the durability.

The urea compound may be aliphatic, cycloaliphatic or aromatic, and can be used by mixing them at an arbitrary rate. Among them, a diurea or polyurea expressed by the following formula 1 is preferable. Among them, diurea is preferable.

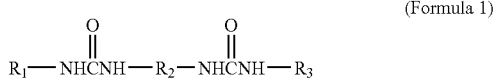

(Formula 1)

(wherein $R_2$ is an aromatic hydrocarbon, aliphatic hydrocarbon or cycloaliphatic hydrocarbon group having a carbon number of 6-15, $R_1$ and $R_3$ are aromatic hydrocarbon groups having a carbon number of 6-12, cyclohexyl groups, cyclohexyl derivatives having a carbon number of 7-12 or alkyl groups having a carbon number of 6-20.

As the base oil, one or more lubricating oils selected from mineral oil, synthetic hydrocarbon oil and ether oil, or a mixed oil mixed at an arbitrary rate may be used. Among them, a mineral oil is preferable. Since a mineral oil has a good compatibility with the urea thickening agent, good lubricity and suitable consistency, there will be no leak of grease, and repairability of the grease film will not be impaired.

The mixing rate of the thickening agent in the urea grease is preferably 1-40 wt %, more preferably 5-20 wt %. If less than 1 wt %, gel hardening of the thickening agent would be insufficient, and the consistency increase, so that grease tends to leak. On the other hand, if over 40 wt %, the consistency would lower, worsening the flowability.

To the urea grease, within such a range that the function of the urea grease will not be impaired, known rust preventives, antioxidants, extreme pressure additives, wear suppressants, oiliness improvers, corrosion inhibitors, pour point depressants, viscosity index improvers, structure stabilizers, thickeners, antistatic agents, emulsifiers and colorants may be added.

The grease 86 is filled into the bearing, specifically between the inner ring 81 and the outer ring 83 as shown in FIG. 11 so as to cover the rolling elements 87 and the retainer 88. If a sealed type bearing is used as the rolling bearing, it is sealed by seals 89 and 90 at the front side and the backside of the bearing. If the sealed type rolling bearing is used, it is possible to prevent the grease 86 from leaking out. Instead of the seals, shield plates may be used.

The two seals 89 and 90 have different shapes. With this arrangement, it is easy to confirm the bearing mounting direction. Thus it is possible to prevent assembling error.

As the kind of rolling bearing according to this invention, it is not specifically limited, but is preferably an angular ball bearing.

The rolling bearing according to this invention can be used at a support portion of a ball screw, particularly a support portion of a ball screw used in a machine tool. Among support portions of ball screws of the machine tool, if it is used at a support portion of a ball screw of a machining center for machining of complicated shapes in which the frequency of microfeed is high, it can effectively reveal the fretting resistance. This is more preferable.

EXAMPLES

Hereinbelow, more detailed description is made with reference to Examples. First in Examples 1 and 2, as judgment about resistance to fretting wear damage, tests were conducted for micro sliding wear and micro pivoting wear.

[Carbonitriding Treatment]

Using inner ring and outer ring plates made of SUJ2, their rolling surfaces were subjected to carbonitriding. For carbonitriding, they were held for 40 minutes at 880° C. in a continuous furnace in which 10% ammonium gas in volumetric ratio was added to NX gas. Next, they were subjected to tempering at 180° C. for two hours to obtain carbonitrided plates.

The surface hardness (HRC) of the plates obtained was 63.2. The HRC before treatment was 61.9.

Example 1

(Micro Pivoting Wear Test)

Figure 13:
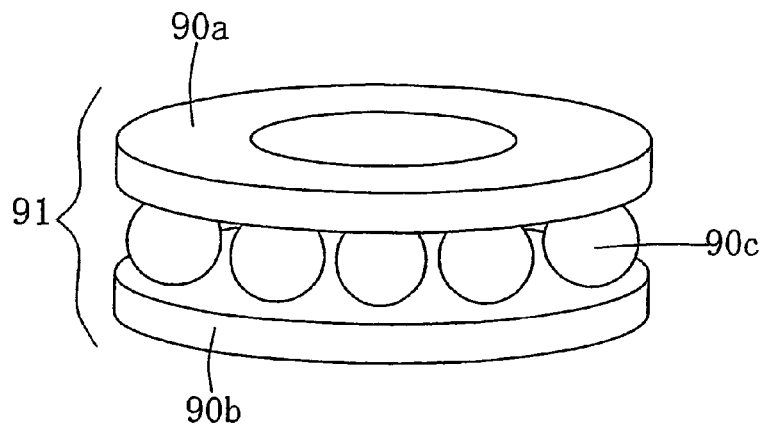
FIG. 13 is a schematic view showing a bearing used in Example 1 and Comparative Examples 1-3.
Figure 14:
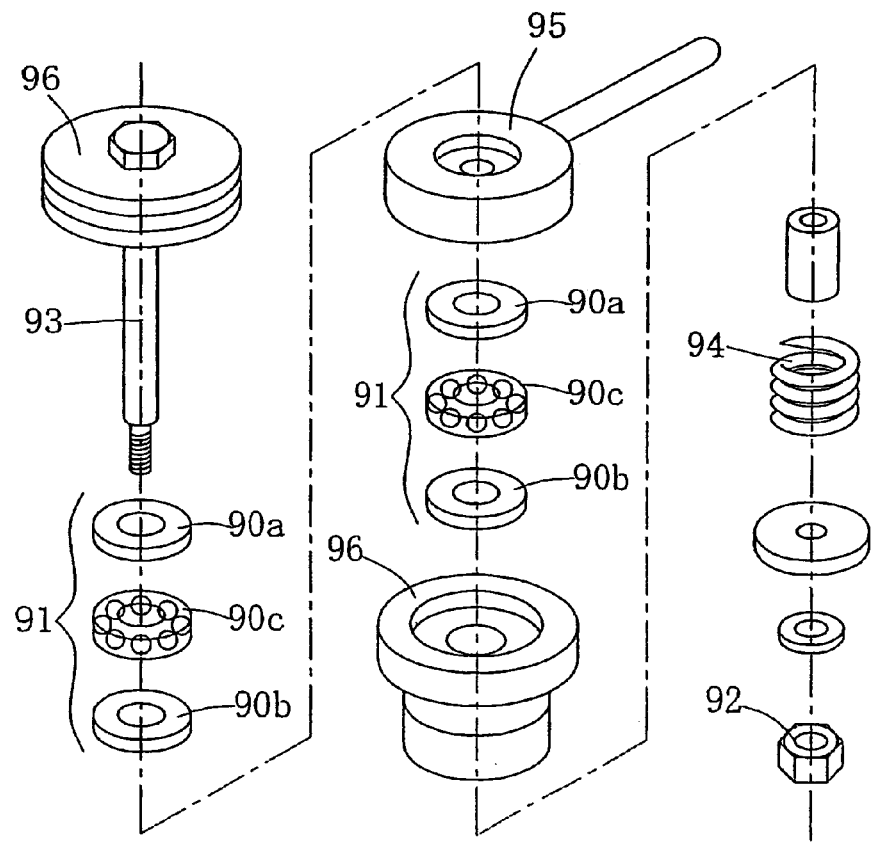
FIG. 14 is an assembly view for conducting a Fafnir fretting corrosion test.
Figure 15:
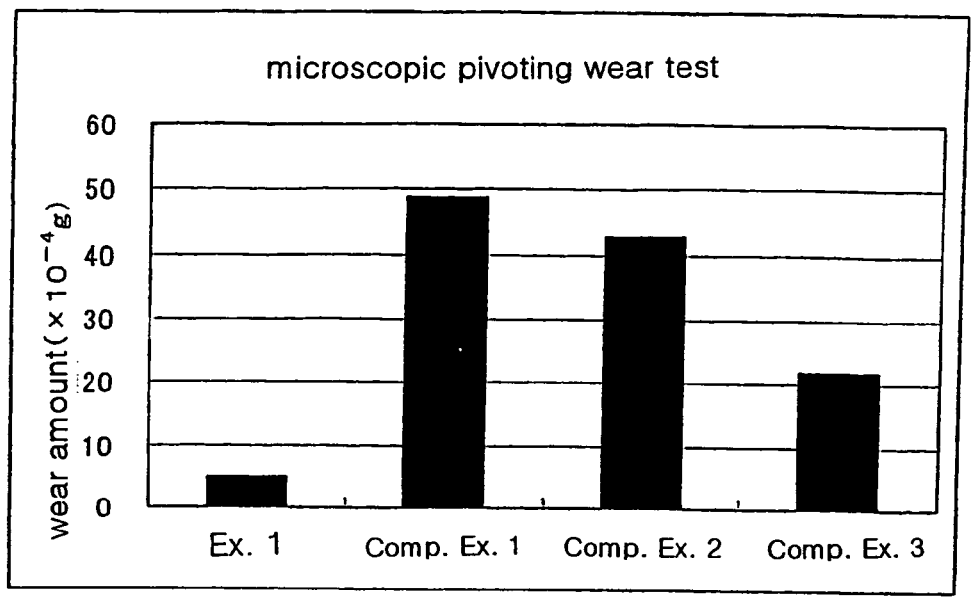
FIG. 15 is a graph showing the results of a microscopic pivoting wear test.

The outer ring 90a and inner ring 90b that have been subjected to the abovesaid carbonitriding, and rolling elements 90C (made of SUJ2) were assembled to manufacture a bearing 91 (inner ring inner diameter×outer ring outer diameter×width=20 mm×40 mm×14 mm). At this time, 1 g of urea grease described in Table 1 was sealed (grease is not shown in FIG. 13). Using this bearing 91, Fafnir fretting corrosion test was conducted under ASTM D 4170. Specifically, as shown in FIG. 14, the outer ring 90a and the inner ring 90b were fixed to two bearing retaining portions 96, and a shaft 93 was passed to a bolt 92 in the order shown. And by adjusting the tightening of the bolt 92, a load was applied by a spring 94 (load=2.45 kN). With a chuck portion set in a tester, a pivoting portion 95 and a motor were coupled together by a crank rod, and the motor was rotated in the atmosphere at room temperature. With the pivoting angle set to 12 deg (critical pivoting angle: 30 deg) and the pivoting cycle set to 30 Hz, the test was conducted for eight hours. In terms of weight reduction of the inner and outer rings after the test, the wear property of the plates was evaluated. The results are shown in FIG. 15.

Comparative Example 1

Except that an inner ring and an outer ring made of SUJ2 and not subjected to carbonitriding, and a lithium-family grease shown in Table 1 was used, a microscopic pivoting wear test was conducted in the same manner as in Example 1. The results are shown in FIG. 15.

Comparative Example 2

Except that as a grease, a lithium grease shown in Table 1 was used, a microscopic pivoting wear test was conducted in the same manner as in Example 1. The results are shown in FIG. 15.

Comparative Example 3

Except that as a grease, a urea grease shown in Table 1 was used, a microscopic pivoting wear test was conducted in the same manner as in Example 1. The results are shown in FIG. 15.

(Results)

From Example 1 and Comparative Examples 1-3, it became apparent that by subjecting the rolling surfaces to carbonitriding and using a urea compound as a grease, microscopic pivoting wear, namely, wear produced due to microscopic rolling markedly decreases. Thus, it became apparent that it had resistance to fretting wear resulting from it.

Example 2

(Microscopic Slide Wear Test)

With rolling elements (made of SUJ2) placed on a plate subjected to the carbonitriding, and using the urea grease described in Table 1 as a grease, micro slide wear tests were conducted by the following method. As for the test conditions at this time, the load applied to the rolling elements was 98 N, amplitude of the rolling elements on the plate was 0.47 mm, the frequency was 30 Hz, the number of loading was $8.6 \times 10^5$ cycles, and the test time was eight hours.

Figure 16:
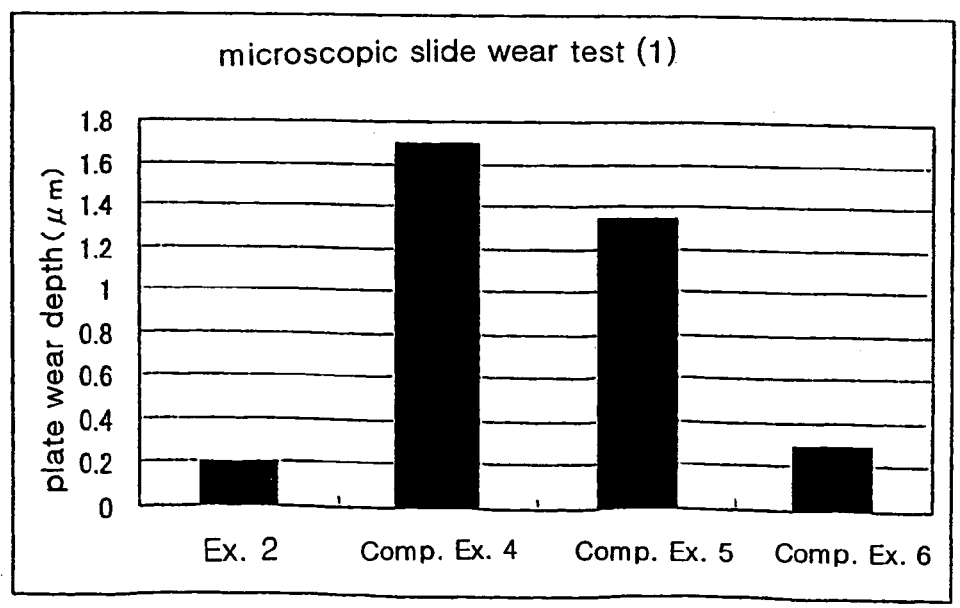
FIGS. 16 and 17 are graphs showing the results of a microscopic slide wear test.
Figure 17:
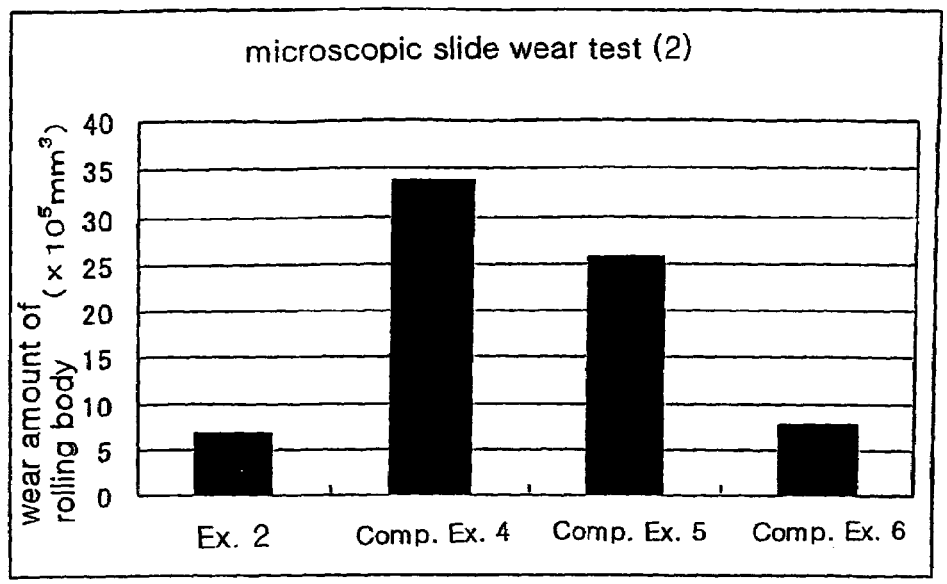

And at 5 or more points and in a direction perpendicular to the wear direction, measurement was made on a Talysurf surface profiler and the deepest value was used as the plate wear depth. Also, the wear amount (γ) of the rolling elements was calculated by measuring the wear diameter with a microscope and using the following formula. The results of plate wear depth are shown in FIG. 16, and the results of wear amount of the rolling elements are shown in FIG. 17.

$$v=(\pi h^2 \times (3r-h))/3$$

$$h=r-(4r^2-c^2)^{1/2}/2$$

wherein γ: radius of the ball, h: wear depth of the ball, c: diameter of wear marks

Comparative Example 4

Except that an inner ring and an outer ring made of SUJ2 and not subjected to carbonitriding, and a lithium grease shown in Table 1 were used, a microscopic slide wear test was conducted in the same manner as in Example 2. The results of plate wear depth are shown in FIG. 16, and the results of wear amount of the rolling elements are shown in FIG. 17.

Comparative Example 5

Except that as a grease, a lithium grease shown in Table 1 was used, a microscopic slide wear test was conducted in the same manner as in Example 2. The results of plate wear depth are shown in FIG. 16, and the results of wear amount of the rolling elements are shown in FIG. 17.

Comparative Example 6

Except that as a grease, a urea grease shown in Table 1 was used, a microscopic slide wear test was conducted in the same manner as in Comparative Example 4. The results of plate wear depth are shown in FIG. 16, and the results of wear amount of the rolling elements are shown in FIG. 17.

(Results)

From Example 2 and Comparative Examples 4-5, it became apparent that by subjecting the rolling surfaces to carbonitriding and using a urea compound as a grease, microscopic slide wear, namely, wear produced due to microscopic sliding markedly decreases. From Example 2 and Comparative Example 6, it became apparent that Example 2 had a sufficient micro slide wear resistance.

Example 3

Figure 18:
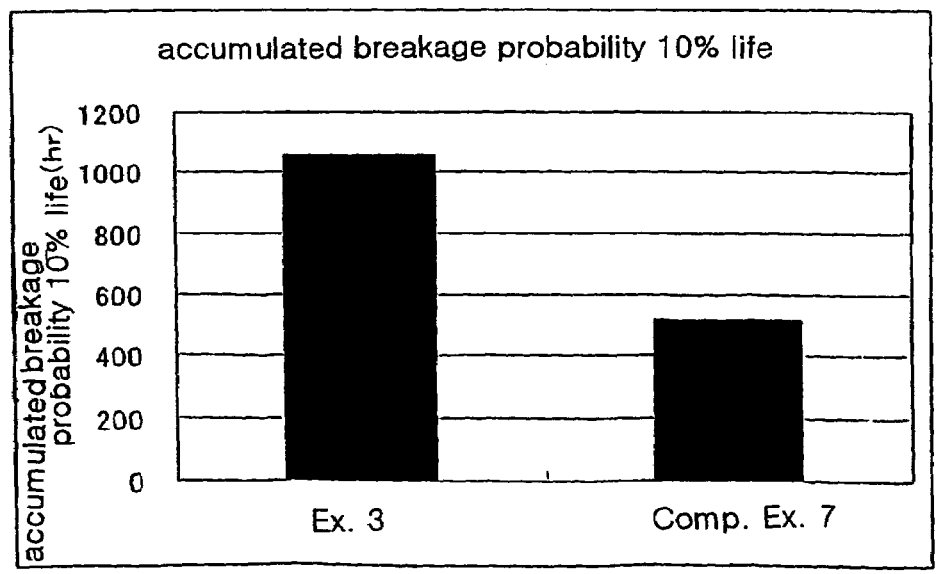
FIGS. 18 and 19 are graphs showing the results of an accumulated breakage probability experiment.

An inner ring 81 and an outer ring 83 made of SUJ2 were subjected to the carbonitriding and assembled with rolling elements made of SUJ2 to manufacture the angular ball bearing shown in FIG. 11. And as a grease, urea grease shown in Table 1 was sealed. A load of 6.9 kN (radial load) was applied to the bearing and it was rotated at 2000 rpm. The accumulated breakage probability 10% life at this time was measured. The results are shown in FIG. 18.

The "Accumulated breakage probability 10% life" refers to the substantially total number of revolutions or operating hours during which 90% (reliability 90%) of identical bearings in a group can be rotated without producing flaking due to rolling fatigue when they are individually rotated under the same conditions.

Comparative Example 7

Except that an inner ring 81 and an outer ring 83 made of SUJ2 were subjected to the through hardening, the accumulated breakage probability 10% life was measured in the same manner as in Example 3. The results are shown in FIG. 18.

Through hardening is a treatment in which after a bearing steel has been heated to and held at 800-850° C., it is cooled rapidly. This forms a martensitic composition in the steel, so that the material is hardened.

Example 4

Figure 19:
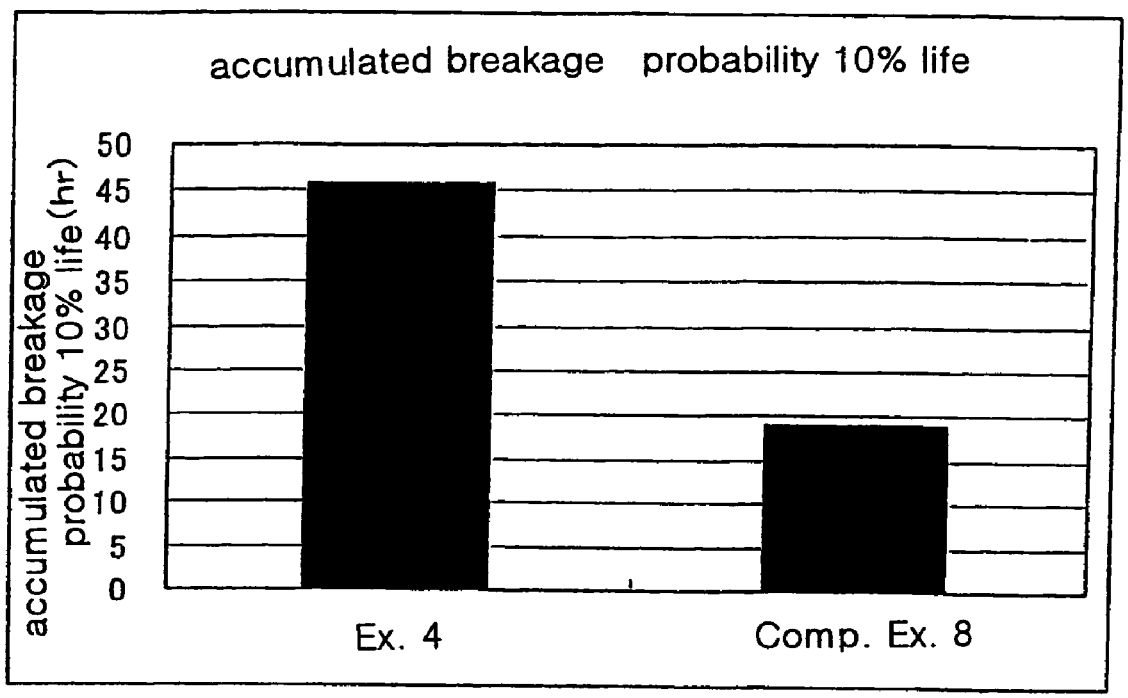

Except that foreign matter was mixed in the urea grease described in Table 1 used as a grease, the accumulated breakage probability 10% life was measured in the same manner as in Example 3. The results are shown in FIG. 19.

Comparative Example 8

Except that an inner ring 81 and an outer ring 83 made of SUJ2 were subjected to the through hardening, the accumulated breakage probability 10% life was measured in the same manner as in Example 4. The results are shown in FIG. 19.

(Results)

From Examples 3 and 4 and Comparative Examples 7 and 8, it became apparent that the angular ball bearing obtained by subjecting the rolling surfaces to carbonitriding and using a urea compound as a grease had a sufficient durability.

EFFECT OF THE INVENTION

With the angular ball bearing of this invention, since rolling elements are disposed between the inner ring and the outer ring, a seal is provided at least on one side, and the seal is fitted on the peripheral surface portion of the counterbore in a pressed state, even though it is of a sealed type, lowering of the strength of the bearing rings or reduction of the front width for the convenience of mounting of the seal will not occur. Thus design is possible for dimensions and practicability equivalent to a non-sealed type bearing.

Also, with the bearing according to this invention, since the inner ring and the outer ring or the rolling elements are subjected to carbonitriding and the grease using a urea compound as a thickening agent is sealed in the bearing, a thin oxide film of a urea compound is formed and a sufficiently thick oil film is formed on the oxide film. Because the thin oxide film of urea compound is high in adhesion to the carbonitrided layer, even if microscopic rolling occurs frequently, grease is held on the rolling surfaces, so that it is possible to suppress fretting damage on the rolling surfaces, thus preventing lowering of the durability effectively.

Further, even if oil film of the grease between the rolling elements and the rolling surfaces should break, so that the rolling elements and rolling surfaces contact directly, due to the function of the carbonitrided layers provided on the rolling elements or the rolling surfaces, production and progression of fretting damage are suppressed for a while. Also, since oil film of grease is high in adhesion to the carbonitrided layers, even if breakage of film occurs, it is quickly repaired. Thus, even if oil film breaks and the rolling elements and rolling surfaces directly contact, oil film can be repaired before fretting damage occurs. Thus, resistance to fretting damage improves greatly.

Also, since this bearing for supporting a ball screw has a seal, the bearing interior is sealed. Thus, scattering of grease, which was observed in a conventional open type bearing, is suppressed.

Further, it is possible to prevent entering of foreign matter such as coolants into the grease from the atmosphere.

Still further, since two kinds of seals are of different shapes, it is easy to confirm mounting directions when assembling the bearing. Thus it is possible to prevent mis-assembling.

The invention claimed is:

1. An angular ball bearing comprising:
an outer ring having an inner peripheral surface, an outer peripheral surface, and a radially inwardly-facing outer raceway groove formed in said inner peripheral surface of said outer ring;
an inner ring disposed within said outer ring and having an inner peripheral surface, an outer peripheral surface, and a radially outwardly-facing inner raceway groove formed in said outer peripheral surface of said inner ring; and
a plurality of rolling elements disposed in said inner raceway groove and said outer raceway groove and radially between said inner ring and said outer ring;
wherein said inner peripheral surface of said outer ring includes a first annular inner peripheral surface portion on a first axial side of said outer raceway groove, and a second annular inner peripheral surface portion on a second axial side of said outer raceway groove;
wherein said outer peripheral surface of said inner ring includes a first annular outer peripheral surface portion on a first axial side of said inner raceway groove, and a second annular outer peripheral surface portion on a second axial side of said inner raceway groove;
wherein said first annular inner peripheral surface portion of said inner peripheral surface of said outer ring is disposed to face said first annular outer peripheral surface portion of said outer peripheral surface of said inner ring across a first annular radial gap that has an annular opening that opens axially outwardly on said first axial side of said inner and outer raceway grooves;
wherein said second annular inner peripheral surface portion of said inner peripheral surface of said outer ring is disposed to face said second annular outer peripheral surface portion of said outer peripheral surface of said inner ring across a second annular radial gap that has an annular opening that opens axially outwardly on said second axial side of said inner and outer raceway grooves;
wherein an inner diameter of said first annular inner peripheral surface portion of said inner peripheral surface of said outer ring is greater than an inner diameter of said second annular inner peripheral surface portion of said inner peripheral surface of said outer ring;
wherein an outer diameter of said first annular outer peripheral surface portion of said outer peripheral surface of said inner ring is greater than an outer diameter of said second annular outer peripheral surface portion of said outer peripheral surface of said inner ring;
wherein a first annular seal is press fit into one of said first and second radial gaps so as to be press fit between one of (a) said first annular inner peripheral surface portion of said inner peripheral surface of said outer ring and said first annular outer peripheral surface portion of said outer peripheral surface of said inner ring, and (b) said second annular inner peripheral surface portion of said inner peripheral surface of said outer ring and said second annular outer peripheral surface portion of said outer peripheral surface of said inner ring;
wherein said inner peripheral surface of said outer ring has no inner peripheral surface portion that both protrudes radially inwardly further than an inner peripheral contact surface portion at which said first annular seal contacts said inner peripheral surface of said outer ring, and is disposed closer than said inner peripheral contact surface portion to the annular opening of said one of said first and second radial gaps in which said first annular seal is press fit;
wherein said outer peripheral surface of said inner ring has no outer peripheral surface portion that both protrudes radially outwardly further than an outer peripheral contact surface portion at which said first annular seal contacts said outer peripheral surface of said inner ring, and is disposed closer than said outer peripheral contact surface portion to the annular opening of said one of said first and second radial gaps in which said first annular seal is press fit;

wherein a portion of said inner peripheral surface of said outer ring extending between said inner peripheral contact surface portion and said radially inwardly-facing outer raceway groove constitutes a conical surface; and wherein said inner diameter of said first annular inner peripheral surface portion of said inner peripheral surface of said outer ring is substantially uniform over the entire axial length of said first annular inner peripheral surface portion.

* * * * *

UNITED STATES PATENT AND TRADEMARK OFFICE
CERTIFICATE OF CORRECTION

PATENT NO.       : 7,287,910 B2
APPLICATION NO.  : 10/488236
DATED            : October 30, 2007
INVENTOR(S)      : Umemitsu Kobayashi et al.

Page 1 of 1

It is certified that error appears in the above-identified patent and that said Letters Patent is hereby corrected as shown below:

On the cover page, item (22) should read:

--PCT filed: September 2, 2002--

Signed and Sealed this

Twenty-ninth Day of April, 2008

JON W. DUDAS
*Director of the United States Patent and Trademark Office*